United States Patent [19]
Frank et al.

[11] Patent Number: 6,026,150
[45] Date of Patent: Feb. 15, 2000

[54] NETWORK PROTOCOL—BASED HOME ENTERTAINMENT NETWORK

[75] Inventors: Edward H. Frank, Portola Valley; John T. Holloway, Woodside, both of Calif.

[73] Assignee: Epigram, Palo Alto, Calif.

[21] Appl. No.: 08/960,842

[22] Filed: Oct. 30, 1997

[51] Int. Cl.[7] .................................................. H04M 11/00
[52] U.S. Cl. .............................. 379/90.01; 379/102.03; 370/445; 455/556
[58] Field of Search .................. 379/90.01, 93.01–93.09, 379/93.26, 93.28, 93.37, 102.01–102.04, 102.07, 106.01, 110.01; 370/445, 450, 481, 488–497; 455/556, 557

[56] References Cited

U.S. PATENT DOCUMENTS

| | | | |
|---|---|---|---|
| 4,882,747 | 11/1989 | Williams | 379/102.03 |
| 5,247,347 | 9/1993 | Litteral et al. | 379/93.12 |
| 5,539,449 | 7/1996 | Blahut et al. | 379/90.01 |
| 5,561,708 | 10/1996 | Remillard | 379/93.01 |
| 5,675,375 | 10/1997 | Riffee | 348/15 |
| 5,848,133 | 12/1998 | Kuwahara et al. | 379/93.01 |

FOREIGN PATENT DOCUMENTS

| | | | |
|---|---|---|---|
| 0 411 422 | 2/1991 | European Pat. Off. | H03J 9/06 |
| 96/13135 | 5/1996 | WIPO | H04Q 9/08 |
| WO96/29808 | 9/1996 | WIPO | 379/90.01 |

OTHER PUBLICATIONS

G. Hanover: "Networking the Intelligent Home—Control of home electronics, from burglar alarms to washing machines, will result from a new communications standard" IEEE Spectrum, vol. 26, No. 10, Oct. 1, 1989, pp. 48/49 XP000071578.

*Primary Examiner*—Wing F. Chan
*Attorney, Agent, or Firm*—Christie, Parker & Hale, LLP

[57] ABSTRACT

An in-home network which includes a telephone line and a plurality of consumer electronic devices coupled to the telephone line. Each of the consumer electronic devices is assigned a unique address, such that each of the consumer electronics devices is individually addressable via the telephone line. The consumer electronic devices communicate using a packet-based protocol, wherein each of the consumer electronic devices transmits analog signal bursts on telephone line. Each of the consumer electronic devices can include a wireless signal receiver, such that a first consumer electronic device can receive control information from a remote control, and then control the operation of a second consumer electronic device by transmitting the control information to the second consumer electronic device via the telephone line.

8 Claims, 3 Drawing Sheets

NETWORK PROTOCOL—BASED HOME ENTERTAINMENT NETWORK

BACKGROUND OF THE INVENTION

1. Field of the Invention

The present invention relates to an in-home network and protocol for connecting consumer electronic devices. More specifically, the present invention relates to a network which uses a telephone line present in the home as a communication channel for transmitting information in accordance with a network protocol

2. Related Art

With the advent of the Internet and Internet Protocols (IP), there is now a standard for how general purpose computers, such as personal computers, workstations and servers can interchange data over the telephone system. However, such Internet Protocols have been limited to computers, and do not facilitate networking within a consumer's residence.

In addition to general purpose computers, a consumer's residence can also include consumer electronics devices. These consumer electronics devices can include, for example, televisions, VCRs, DVD players, audio systems (e.g., receivers, amplifiers, CD players, tape players and speakers), telephones, camcorders and digital satellite systems (DSS). Some of these devices are designed to be coupled to one another by dedicated communication channels during normal operation. For example, televisions, VCRs and DSS are typically designed to be coupled to one another by coaxial cable. However, there are particular groups of consumer electronic devices which are not typically designed to be coupled to one another. For example, telephones are not typically designed to be coupled to televisions. It would therefore be desirable to have a network for operably connecting a wide variety of consumer electronics devices to a single network within the consumer's residence. It would also be desirable if such network would facilitate the easy addition of additional consumer electronic devices.

SUMMARY

Accordingly, the present invention provides a network which enables various consumer electronics devices to be operably coupled to one another using the telephone line present in the consumer's residence. Each consumer electronic device includes a modem for communicating on the telephone line.

In accordance with one embodiment of the invention, a network protocol is provided for operating the modem within each of the consumer electronics devices. The network protocol involves modulating packets of digital information by a transmitter circuit of the modem, wherein the packets of digital information are converted into analog signal bursts of discrete duration. These analog signal bursts are transmitted from the transmitter circuit to the telephone line. However, no signal is provided from the transmitter circuit to the telephone line between the analog signal bursts. As a result, many modems can share the telephone line. The various modems perform an arbitration function to ensure that only one modem is transmitting analog signal bursts to the telephone line at any given time. In one embodiment, a non-idle state signal is appended to the beginning of the analog signal bursts by the transmitter circuit, thereby signaling the presence of the analog signal bursts.

A receiver circuit of the modem monitors the telephone line to detect the presence and absence of the analog signal bursts. This monitoring step is performed by a non-idle detector within the receiver circuit. When the non-idle detector detects the presence of the analog signal bursts on the telephone line, the non-idle detector causes the receiver circuit to demodulate the analog signal bursts using full processing capabilities of the receiver circuit. Each analog signal burst includes an address or addresses of the devices which are to respond to the analog signal burst.

When the non-idle detector detects the absence of the analog signal bursts on the telephone line, the non-idle detector disables the demodulating function of the receiver circuit. This greatly reduces the processing requirements of the receiver circuit when there are no analog signal bursts present on the telephone line.

In one variation, each of the analog signal bursts includes a preamble and a corresponding main body. Each preamble is transmitted in accordance with a predetermined first modem protocol. However, the main bodies can be transmitted in accordance with different modem protocols which are different than the first modem protocol. For example, the different modem protocols may implement different data rates, modulation formats and/or protocol versions. The modem protocol associated with each of the main bodies is identified by information included in the corresponding preamble. This variation enables devices having different operating capabilities (e.g., personal computers and televisions) to be operably coupled to the same telephone line in a multi-drop configuration.

The present invention will be more fully understood in view of the following detailed description taken together with the drawings.

DETAILED DESCRIPTION

Figure 1:
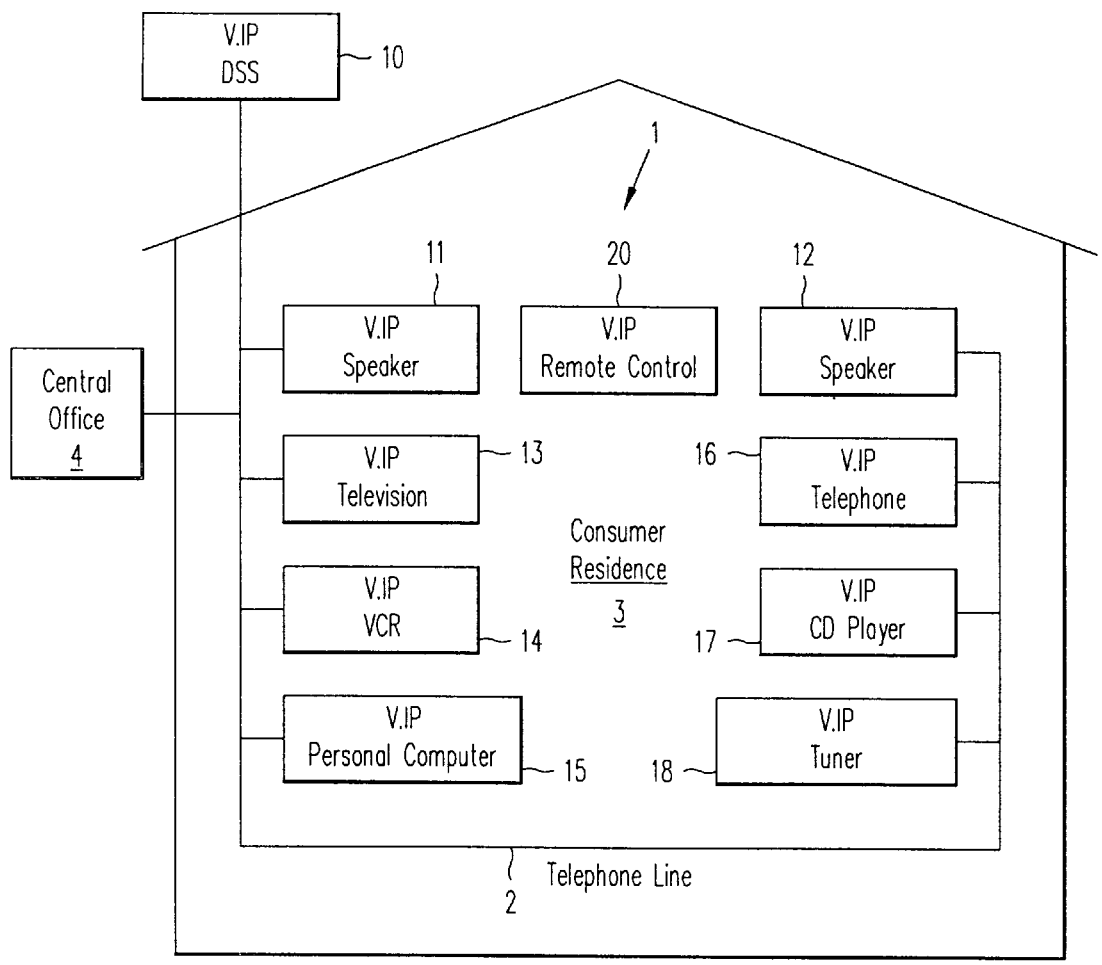
FIG. 1 is a block diagram of an in-home network in accordance with one embodiment of the present invention.

FIG. 1 is a block diagram of an in-home network 1 in accordance with one embodiment of the present invention. In-home network 1 includes various consumer electronic devices which are coupled to a common telephone line 2 in the consumer's residence 3. The telephone line 2, which is a conventional twisted pair conductor, is also connected to a telephone company central office 4 in a manner well known in the art. The consumer electronic devices coupled to the telephone line 2 within the consumer's residence 3 include DSS 10, speakers 11 and 12, television 13, video-cassette recorder (VCR) 14, personal computer 15, telephone 16, compact-disc (CD) player 17 and tuner 18. The illustrated consumer electronic devices are intended to be illustrative, but not limiting. Thus, other types of consumer electronics devices, such as camcorders, can be coupled to telephone line 2 in accordance with the principles of the present invention. In-home network further includes a wireless remote control 20 for controlling the consumer electronic devices. Each of the consumer electronic devices 10–18 and remote control 20 operate in accordance with a network protocol which is described in more detail below. This network protocol will hereinafter be referred to as V.IP. Thus, the consumer electronic devices 10–18, which are designed to operate in accordance with the V.IP protocol can be generically be referred to as V.IP consumer electronic devices.

As described in more detail below, the V.IP consumer electronic devices communicate over the telephone line 2 using the V.IP protocol. The V.IP protocol is a packet-based protocol, whereby the V.IP consumer electronic devices 10–18 communicate by transmitting analog signal bursts over the telephone line 2.

Figure 2:
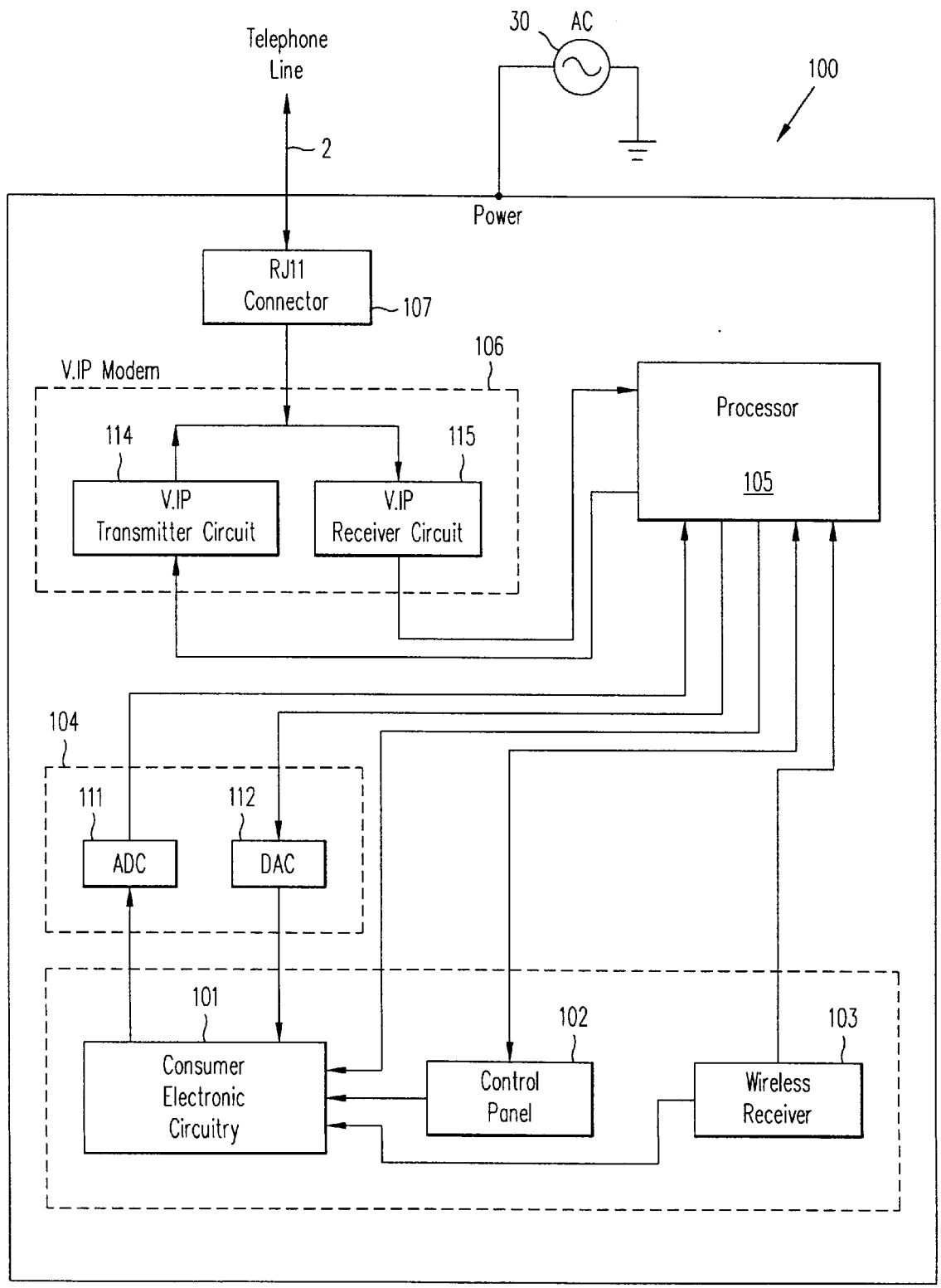
FIG. 2 is a block diagram of a generic consumer electronic device for connection to the in-home network of FIG. 1.

FIG. 2 is a block diagram of a generic V.IP consumer electronic device 100 in accordance with the present invention. Thus, the architecture of generic V.IP consumer electronic device 100 can be used to construct any one of the specific consumer electronic devices 10–18. V.IP consumer electronic device 100 is coupled to telephone line 2 and 120 volt AC power source 30 as illustrated. V.IP consumer electronic device 100 includes consumer electronic circuitry 101, control panel circuitry 102, wireless receiver circuitry 103, coder/decoder (codec) circuit 104, processor 105, V.IP modem 106, and RJ11 connector 107. Codec circuit 104 include analog-to-digital converter (ADC) 111 and digital-to-analog converter (DAC) 112. V.IP modem 106 includes V.IP transmitter circuit 114 and V.IP receiver circuit 115.

Consumer electronic circuitry 101 includes the conventional circuitry and hardware associated with the particular consumer electronic device. For example, the consumer electronic circuitry 101 associated with DSS 10 would include a satellite dish and a set-top box (including the receiver circuitry). For V.IP speaker 11, the consumer electronic circuitry 101 would include conventional speaker hardware, including a speaker cone, coil and magnets. V.IP speaker 11 is a powered speaker. Thus, V.IP speaker 11 also includes an amplifier for driving the speaker. For V.IP television 13, the consumer electronic circuitry 101 would include a picture tube and conventional control circuitry. Similarly, for VCR 14, personal computer 15, telephone 16, CD player 17 and tuner 18, the consumer electronic circuitry 101 would include the conventional circuits and hardware typically associated with these devices.

Control panel circuitry 102 includes the conventional front panel control circuitry associated with the particular consumer electronic device. That is, control panel circuitry 102 provides a physical interface for the consumer to control the consumer electronic device 101. For example, for V.IP speaker 11, the control panel circuitry 102 would include an on/off switch and volume control knob for controlling the amplifier within the powered speaker. For V.IP tuner 18, the control panel circuitry 102 would include, for example, the on/off switch, volume control knob, balance control levers, equalizer levers, and tuner knob. For the V.IP personal computer 15, the control panel circuitry 102 would include, for example, a keyboard or mouse.

The control panel circuitry 102 is coupled to transmit control signals to the consumer electronic device 101, thereby causing the consumer electronic device 101 to be controlled in the appropriate manner (e.g., change the channel, increase the volume).

The wireless receiver 103 is a conventional circuit which receives wireless control signals (e.g., infra-red signals) generated by remote control 20. In response to the wireless control signals, wireless receiver 103 transmits control signals to the consumer electronic circuitry 101, thereby causing the consumer electronic circuitry 101 to be controlled in the desired manner.

The combination of consumer electronic circuitry 101, control panel circuitry 102 and wireless receiver 103 form a conventional consumer electronic device. For example, these three elements may combine to form a conventional (non-V.IP) television or a conventional (non-V.IP) speaker. These conventional elements of consumer electronic device 100 are surrounded by a dashed line in FIG. 2.

In accordance with the present invention, control panel circuitry 102 and wireless receiver 103 are further coupled to provide control signals to processor 105. As described in more detail below, processor 105 generates digital packet data in response to these control signals, and transmits this digital packet data to V.IP transmitter circuit 114 for further processing. As described in more detail below, the control signals provided by front panel circuitry 102 and wireless receiver 103 can be used to control another one of the V.IP consumer electronic devices. Conversely, processor 105 can receive digital packet data from V.IP receiver circuit 115, and in response, control consumer electronic circuitry 101.

Consumer electronic device 101 is further coupled to ADC 111 and DAC 112 of codec 104 as illustrated. The purpose of ADC 111 is to convert analog output signals received from the consumer electronic circuitry 101 into digital output signals which are provided to processor 105. The purpose of DAC 112 is to convert digital signals received from processor 105 into analog signals which are provided to the consumer electronic circuitry 101. All or part of codec 104 may not be required, depending upon the nature of the V.IP consumer electronic device 100. For example, V.IP speaker 11 would not require ADC 111 since a speaker is a device which does not generate any output analog signals. However, V.IP speaker 11 would use DAC 112 to generate an analog signal for driving the amplifier of the speaker. V.IP tuner 18 would require ADC 111 since a tuner is a device which generates analog output signals. V.IP personal computer 15 would require neither ADC 111 nor DAC 112 since a personal computer generates digital input and output signals. Thus, the specific requirements of codec 104 are determined on a case by case basis in view of the operating characteristics of underlying conventional consumer electronic device.

Processor 105 receives digital signals from consumer electronic circuitry 101, control panel circuitry 102 and wireless receiver 103, and in response, generates digital data packets for transmission to V.IP transmitter circuit 114. These digital data packets can include various information in accordance with the V.IP protocol. For example, these digital data packets can be representative of audio or video information transmitted from consumer electronic circuitry 101, or control information transmitted from consumer electronic circuitry 101, control panel circuitry 102 or wireless receiver 103.

Figure 3:
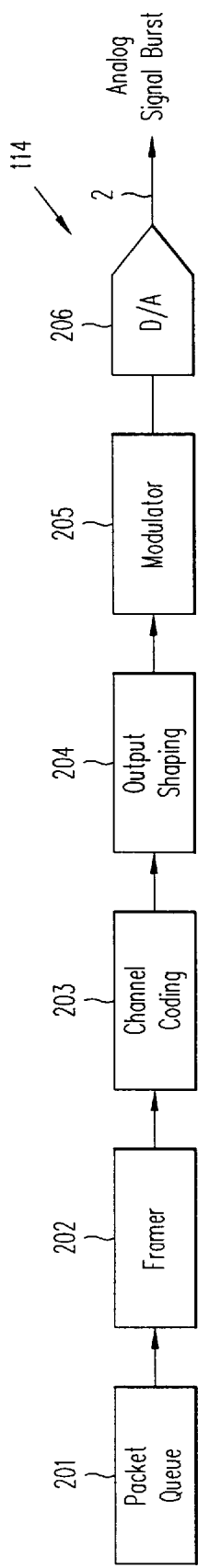
FIG. 3 is a block diagram of a transmitter circuit of a consumer electronic device of FIG. 2 in accordance with one embodiment of the invention.

FIG. 3 is a block diagram of V.IP transmitter circuit 114 in accordance with one embodiment of the invention. V.IP transmitter circuit 114 includes packet queue 201, framer 202, channel coding circuit 203, output shaper 204, modulator 205 and digital-to-analog (D/A) converter 206. In general, V.IP transmitter circuit 114 transforms the digital data packets received from processor 105 into analog burst signals having discrete durations. In accordance with the V.IP protocol, V.IP transmitter circuit 114 does not insert idle information between the digital data packets. As a result, the analog burst signals do not form a continuous signal, but instead, provide time periods during which other V.IP transmitter circuits can transmit analog burst signals on telephone line 2. V.IP transmitter circuit 114 optionally transmits a predetermined non-idle state signal to indicate that an analog burst signal is about to be transmitted.

More specifically, within V.IP transmitter circuit 114, the digital data packets provided by processor 105 are stored in packet queue 201. These packets are not synchronous with respect to the modem bit clock, but arrive at packet queue 201 at random times. Framer 202 receives the packets from packet queue 201, and in response, composes discrete bit streams which are synchronous with respect to the modem bit clock.

The synchronous bit streams generated by framer 202 are coded by channel coding circuit 203. Channel coding circuit 203 is used to compensate for noise and distortion on telephone line 2. Channel coding circuit 203 provides redundant information (e.g., convolutional encoding) to allow for error correction. Channel coding circuit 203 further performs a scrambling function, as well as mapping the coded bit streams onto symbol values. The symbol values generated by channel coding circuit 203 is provided to output shaper 204.

Output shaper 204 digitally filters the symbol values received from channel coding circuit 203. Output shaper circuit 204 limits the frequency bandwidth of these symbol values within a predetermined range and may also be adjusted to help compensate for channel distortion. The filtered samples provided by output shaper 204 are provided to modulator 205, which modulates a carrier signal by the filtered samples. The output of modulator 205 is provided to D/A converter 206, which generates an analog signal bursts for transmission on telephone line 2.

The previously described elements of V.IP transmitter circuit 114 are largely conventional. Thus, the encoding of the analog signal bursts may be performed in accordance with a conventional modem protocol, such as xDSL or a voice band modem protocol. However, a conventional modem transmitter circuit transmits a continuous analog output signal by inserting idle information between the digital data packets. Framer 202 typically inserts this idle information. As previously described V.IP transmitter circuit 114 does not insert idle information, thereby resulting in the generation of analog signal burst of discrete duration. This is because is V.IP transmitter circuit 114 were to generate a continuous analog output signal, packet based communication on telephone line 2 would not be possible.

The analog signal bursts generated by V.IP transmitter circuit 114 are routed through RJ11 connector 107 to telephone line 2. In accordance with one embodiment of the invention, the effective data transmission rate on telephone line 2 is at least about 1.5 Mbits per second. This enables the transmission of compressed video and uncompressed audio signals on telephone line 2. The analog signal bursts are transmitted to each of the consumer electronics devices connected to telephone line 2, as well as, optionally, to the telephone company central office 4. More specifically, the analog signal bursts are transmitted to the V.IP receiver circuits present in each of the consumer electronics devices connected to telephone line 2.

Figure 4:
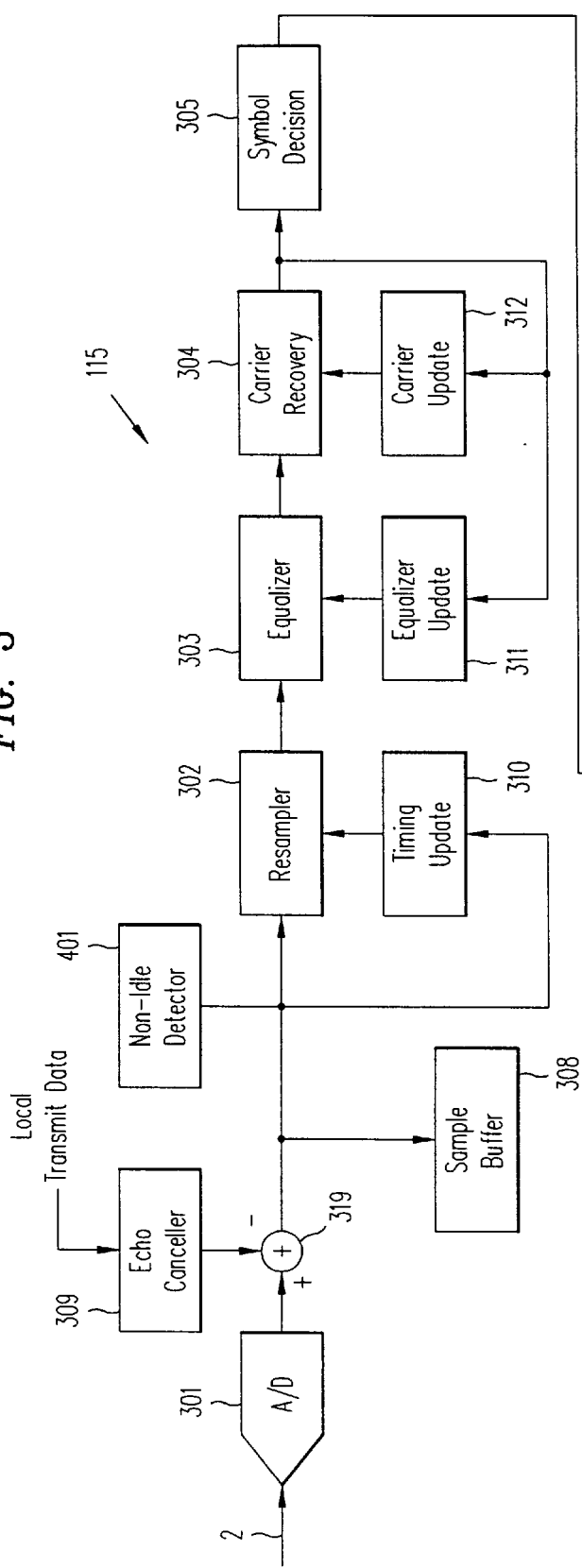
FIG. 4 is a block diagram of a receiver circuit of a consumer electronic device of FIG. 2 in accordance with one embodiment of the invention.

FIG. 4 is a block diagram of V.IP receiver circuit 115 in accordance with one embodiment of the present invention. V.IP receiver circuit 115 includes A/D converter 301, resampler 302, equalizer 303, carrier recovery circuit 304, symbol decision circuit 305, channel decoder 306, framer/idle detector 307, sample buffer 308, echo canceler 309, timing update circuit 310, equalizer update circuit 311, carrier update circuit 312, non-idle detector 401 and summing node 319. In combination, carrier recovery circuit 304 and symbol decision circuit 305 form a demodulator. V.IP receiver circuit 115 is coupled to receive analog signal bursts which are transmitted on telephone line 2.

A/D converter 301 samples the analog signal bursts, thereby converting the analog signal bursts into digital signals. These digital signals are provided to a positive input terminal of summing node 319. Echo canceler 309 monitors the analog signal bursts generated by V.IP transmitter circuit 114 and adaptively predicts the echo signals on telephone line 2. An echo of the locally generated analog signals may be present if V.IP modem 106 is operating in full duplex mode. Echo canceler 309 applies the predicted echo signal to the negative input terminal of summing node 319, thereby canceling the echo introduced by the local analog signal bursts generated by transmitter circuit 114.

The digital signals output by summing node 319 are provided to conventional resampler 302. Resampler 302 interpolates these digital signals to generate samples which match the symbol rate of a V.IP transmitter circuit. Timing update circuit 310 monitors the digital signals provided by summing node 319. Timing update circuit 310 is a conventional circuit which runs a control loop to extract symbol timing information from these digital signals. This symbol timing information is provided to resampler 302, thereby enabling resampler 302 to control the sampling process as necessary.

The digital signals output by summing node 319 are further provided to sample buffer 308. Sample buffer 308 is a dual-port first-in, first-out (FIFO) circular buffer which stores a most recent history of the digital signals provided by summing node 319. In the described embodiment, the information stored in sample buffer 308 is representative of a plurality of the most recent symbols.

The raw input samples are routed from resampler 302 to adaptive equalizer 303. Adaptive equalizer 303 is a conventional element which modifies the raw input samples to compensate for linear distortions introduced by telephone line 2. To accomplish this, equalizer 303 processes the raw input samples using a plurality of equalization coefficients which are updated periodically within equalizer update circuit 311 based on quantization errors measured at the output of the symbol decision circuit 305.

Equalizer 303 provides a stream of equalized digital samples to carrier recovery circuit 304. Carrier recovery circuit 304 is a conventional element which extracts the carrier signal from the equalized digital samples and, for each digital sample, provides a soft decision (i.e., a best estimate) concerning the identity of the corresponding symbol. The symbols achieved by the soft decision are hereinafter referred to as soft symbols. The soft symbols are transmitted to symbol decision circuit 305.

Symbol decision circuit 305 is a conventional circuit which quantizes the soft symbols provided by carrier recovery circuit 304, thereby making a hard decision as to the identity of the received symbols. The symbols achieved by the hard decision are hereinafter referred to as hard symbols. The hard symbols are fed back to equalizer update circuit 311 and carrier update circuit 312. In response, equalizer update circuit 311 and carrier update circuit 312 determine quantizer error. In response to the quantizer error, equalizer update circuit 311 and carrier update circuit 312 adjust the processing coefficients used by equalizer 303 and carrier recovery circuit 304, respectively, thereby improving the accuracy of the hard decisions made by symbol decision circuit 305.

The hard symbols generated by symbol decision circuit 305 are also provided to conventional channel decoding circuit 306. Channel decoding circuit 306 uses redundant information in present in the received analog signal bursts to correct for quantizer errors. Channel decoding circuit 306 typically implements a maximum likelihood sequence estimator (MLSE) circuit, such as a Viterbi decoder, or some other form of error correction. Channel decoding circuit 306 provides a decoded bit stream to framer 307. Finally, framer 307 decodes the bit stream into packet data, discarding the idle information, and loading the packets of data into packet queue 318.

In accordance with the V.IP protocol, the analog signal bursts are immediately preceded by a predetermined signaling on the communication channel (i.e., a non-idle state signal). This signaling is selected to be detected by non-idle detector 401 without the computational complexity of full demodulation. Three such signaling schemes are discussed below.

First, an easily detected signal, such as a pure tone, can be used to signal the presence of analog signal bursts (hereinafter referred to as a DATA state) and the absence of analog signal bursts (hereinafter referred to as a NO DATA state). In the described example, the easily detected signal is prefixed to the onset of the transmission of each analog signal burst. Upon detecting the easily detected signal, non-idle detector 401 enables the full processing mode of V.IP receiver circuit 115, thereby causing V.IP receiver circuit 115 to perform full demodulation on the incoming analog signal burst. After the analog signal burst has been received, non-idle detector 401 detects the absence of the easily detected signal (and the analog signal burst) on the communication channel, and in response, enables a reduced processing mode of V.IP receiver circuit 115. To enable the reduced processing mode of V.IP receiver circuit 115, non-idle detector 401 disables resampler 302, equalizer 303, carrier recovery circuit 304, symbol decision circuit 305, channel decoder 306, framer/idle detector 307, echo canceler 309, timing update circuit 310, equalizer update circuit 311, carrier update circuit 312 and packet queue 318 of receiver circuit 115, thereby simplifying the modem function when there is no analog signal burst being received (i.e., during the NO DATA state).

In a second scheme, non-idle detector 401 monitors the presence and absence of carrier energy on telephone line 2 to determine whether an analog signal burst is being received. Upon detecting carrier energy on telephone line 2, non-idle detector 401 enables the full processing mode of V.IP receiver circuit 115. When no carrier energy (or a minimum carrier energy) is detected on telephone line 2, non-idle detector 401 enables the reduced processing mode of V.IP receiver circuit 115.

In a third scheme, a sub-carrier signal is used to signal the presence and absence of analog signal bursts. In this embodiment, the sub-carrier signal is demodulated with much less computational requirements than the analog signal bursts. One example of a signaling protocol which uses a sub-carrier signal is multi-carrier modulation (MCM) signaling. One example of MCM signaling is Discrete Multi-Tone (DMT) signaling. Although the receiver circuit used in connection with an MCM signaling protocol (hereinafter an MCM receiver circuit) uses different circuitry than V.IP receiver circuit 115, such an MCM receiver circuit is well known in the art and can be adapted for use with a non-idle detector in the manner described below.

In MCM signaling, the received analog signal consists of multiple sub-channels in the frequency domain. In such a format, one of these sub-channels is used by the associated transmitter circuit to signal the presence of the DATA state. A non-idle detector circuit is coupled to receive the selected sub-channel of the incoming MCM signal. Upon detecting the sub-channel signaling, the non-idle detector circuit causes the receiver circuit to enter into a full processing mode, in which the received analog signal is processed using the full processing capabilities of the receiver circuit. After the packet data has been transmitted, the sub-channel signal is de-asserted. Upon detecting the absence of the sub-channel signal, the non-idle detector enables a reduced processing mode within the receiver circuit.

In the foregoing schemes, V.IP receiver circuit 115 (or the MCM receiver circuit) operates with a reduced level of processing to monitor the telephone line 2 to detect the presence of a DATA state. After a time-out period has expired, telephone line 2 can automatically be assigned to a call-inactive status, and the detection processing performed by non-idle detector 401 can be reduced. The associated V.IP transmitter circuit can then initiate a session by transmitting a non-idle state signal long enough to ensure that non-idle detector 401 detects the subsequent DATA state. Alternatively, V.IP receiver circuit 115 can periodically poll the other end of the communication channel (i.e., the associated V.IP transmitter circuit), and only enable non-idle detector 401 during a window following each poll.

Alternatively, V.IP receiver circuit 115 can periodically enable the non-idle detector 401 during predetermined time intervals which can be used by the remote V.IP transmitter circuit to signal the transmission of an analog signal burst. A periodic poll or some other timing signal would be used to maintain synchronization of these time intervals between V.IP receiver circuit 115 and the remote V.IP transmitter circuit. In this manner, the processing requirements of V.IP receiver circuit 115 are further reduced.

As previously described, when no analog signal burst is being received, there is a statistically significant reduction in the amount of processing required within V.IP receiver circuit 115. This reduction in processing can be used to reduce power consumption.

In accordance with another aspect of the invention, the quality of telephone line 2 can be determined by monitoring various elements within V.IP receiver circuit 115. For example, error correction circuitry present in channel decoder 306 can be monitored to determine the quality of telephone line 2 (i.e., whether a large or small amount of error correction is being performed). Another measure of the signal quality is the mean of the square of the quantizer error (i.e., the difference between the input and the output of the symbol decision circuit 305). If telephone line 2 is determined to be a high quality connection, then the processing within V.IP receiver circuit 115 can be reduced. For example, equalizer 303, carrier recovery circuit 304, timing update circuit 310 and echo canceler 309 can be operated in a reduced precision processing mode when a high quality telephone line 2 exists. The processing performed by V.IP receiver circuit 115 in the reduced precision mode in accordance with this variation is approximately 50 to 25 percent of the processing required in the full processing mode.

In a variation of this embodiment, the quality of telephone line 2 can be determined using higher protocol layers, and the processing precision of V.IP receiver circuit 115 can be adjusted accordingly.

In another variation, echo canceler 309 can monitor the coefficients used to generate the echo signal. There are typically a predetermined number of coefficients used to generate the echo signal. If certain coefficients are small enough to be ignored, the number of coefficients used to generate the echo signal can be reduced (with the insignificant coefficients being ignored). As a result, the processing requirements of echo canceler 309 are advantageously reduced.

In accordance with another aspect of the invention, when using the V.IP protocol, V.IP transmitter circuit 115 will not be continuously transmitting. During the periods when V.IP transmitter circuit 115 is not transmitting analog signal bursts, there is no possibility of an echo signal on telephone line 2. Accordingly, echo canceler 309 can be disabled when the local V.IP transmitter circuit 114 is not transmitting analog signal bursts, thereby further reducing the processing requirements of V.IP receiver circuit 115.

The previously described V.IP protocol effectively enables multi-drop operation. In multi-drop operation, multiple V.IP modems are connected to the same telephone line 2 using time-division multiplexing.

Because the V.IP transmitter circuits in V.IP modems do not generate IDLE symbols in accordance with the V.IP protocol, these V.IP transmitter circuits do not introduce any traffic onto telephone line 2 during the time that the V.IP transmitter circuits are not transmitting analog signal bursts. As a result, any V.IP transmitter circuit coupled to telephone line 2 can establish a session on telephone line 2 as follows.

First, the V.IP transmitter circuits coupled to telephone line 2 can transmit analog signal bursts whenever necessary. However, this may introduce collisions between analog signal bursts sent by different V.IP transmitter circuits. A better solution is to use a carrier sense multiple access (CSMA) scheme, where each V.IP transmitter circuit monitors the telephone line 2 prior to transmitting an analog signal burst. A common extension to CSMA is CSMA/CD in which transmissions are immediately terminated if collisions are detected. Such CSMA schemes are commonly used in the ethernet field. These CSMA schemes enable effective communication between a plurality of V.IP modems connected to a single telephone twisted pair wire (e.g., line 2).

An alternative to the contention based protocols described above are a class of schemes commonly referred to as reservation based protocols. Applying these well known techniques, multiple V.IP modems use a separate arbitration channel to decide which modem gains access to the telephone line 2.

In an alternative embodiment, multi-drop access is provided by implementing well known time division multiple access (TDMA) techniques in which every V.IP transmitter circuit is assigned a fixed time slot during which to transmit analog signal bursts. The advantage of this scheme is ease of implementation. In yet other embodiments, multi-drop access is provided by implementing conventional frequency division multiple access (FDMA) schemes, code division multiple access (CDMA) arbitration schemes, or data sense multiple access (DSMA) schemes.

Figure 5:
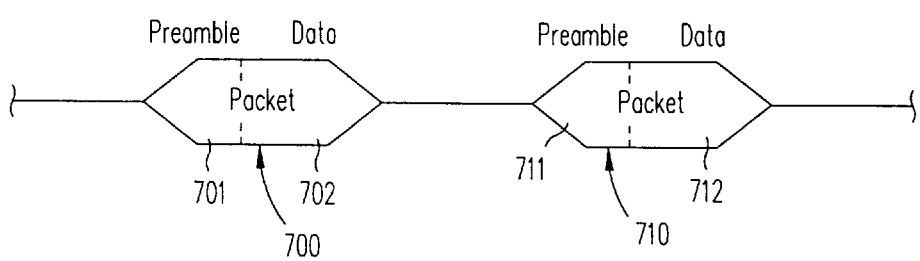
FIG. 5 is a schematic representation of packet information which is transmitted by transmitter circuits in accordance with the burst-mode protocol of the present embodiment.

FIG. 5 is a schematic representation of analog signal bursts 700 and 710 which are transmitted by V.IP transmitter circuits in accordance with one embodiment of the present invention. In the described example, it is assumed that analog signal burst 700 is transmitted by a first V.IP transmitter circuit, and the analog signal burst 710 is transmitted by a second V.IP transmitter circuit. That is, analog signal burst 700 can be transmitted by any one of the consumer electronic devices 10–18 (FIG. 1). Analog signal burst 700 includes a preamble 701 and a main body 702. Analog signal burst 700 is transmitted using a gated modulation or gated carrier signal. Preamble 701, which is approximately 20 to 100 symbols in length, includes information identifying the nature of the packet 700. For example, preamble 701 can include information which identifies: (1) a version or type field for the preamble, (2) source and destination addresses associated with the analog burst signal, (3) the line code (i.e., the modem protocol being used), (4) the data rate, (5) error control parameters, (6) length of the analog signal burst and (7) a timing value for the expected reception slot of a subsequent analog signal burst.

The V.IP receiver circuits in consumer electronics devices 10–18 detect the information present in the preamble 701 and establish synchronization at the beginning of the analog signal burst 700. In the described embodiment, all preambles are transmitted at a relatively low, common transmission rate. The preamble 701 contains information which identifies the data rate of the main body 702 of the analog signal burst. For example, the preamble 701 may indicate that the main body 702 of the analog signal burst 700 includes data which is being transmitted at a higher data rate than the preamble. The V.IP transmitter circuit then transmits the main body 702 of the analog signal burst 700 at this higher rate. The V.IP receiver circuit identified by the destination address of preamble 701 then receives the main body 702 of the analog signal burst 700 at the rate identified in the preamble 701.

Returning to FIG. 5, analog signal burst 710 is representative of an analog signal burst transmitted by a second V.IP transmitter circuit. Analog signal burst 710 includes preamble 711 and main body 712. Preamble 711 includes information which is transmitted at the same rate as the information of preamble 701. However, preamble 711 indicates that the main body 712 is transmitted at a second data rate, which is different from the data rate of the main body 702 of analog signal burst 700.

Because the V.IP receiver circuits are informed of these different data rates prior to receiving main body 702 and main body 712, the V.IP receiver circuits are able to adjust for these different data rates. More specifically, preamble 711 can be used to select a different set of update coefficients for use within the associated V.IP receiver circuit to process main body 712.

The previously described rate adaptive protocol allows both simple devices (which communicate at a relatively low speed) and complex devices (which communicate at a relatively high speed) to be operably coupled to a single telephone line at the same time.

Because the preamble of each analog signal burst includes the destination address of the analog signal burst, each V.IP receiver circuit can monitor the destination address of each analog signal burst, and in response, filter the analog signal bursts which do not need to be demodulated, thereby reducing the processing requirements of the V.IP receiver circuits. In addition, because the preamble of each analog signal burst includes a source address, the V.IP receiver circuits can recall appropriate stored configuration parameters specific to the source in order to speed the acquisition/demodulation of the analog signal burst.

As previously described, the preamble can also contain error control information that will be used by the main body of the analog signal burst. Using this scheme, the same V.IP modem can accommodate both "expensive" error control schemes such as might be required for video applications, as well as "inexpensive" error control schemes which might be used for traditional packet-based traffic. Another portion of the error control information can be used to "request an acknowledgment" from the V.IP receiver circuit. If the received analog signal burst is acceptable, then the V.IP receiver circuit will cause an acknowledge (ack) signal to be transmitted to the V.IP modem residing at the source address. If the received analog signal burst is not acceptable, then the V.IP receiver circuit will cause a no acknowledge (nack) signal to be transmitted to the V.IP modem residing at the source address.

Examples of operating the in-home network 1 will now be provided. As previously described, the V.IP protocol transmits analog signal bursts having source and destination addresses. Thus, each of the consumer electronic devices 10–18 must be assigned a network address. These network addresses can be pre-assigned during manufacture of the consumer electronic device or can be assigned using a conventional dynamic host configuration protocol (DHCP) with a DHCP server as known by one of ordinary skill in the art (e.g., with personal computer 15, or by central office 4).

After the network addresses have been assigned, any one of the consumer electronic devices 10–18 can communicate with any other of the consumer electronic devices 10–18 over telephone line 2 by appropriately addressing the analog signal burst. Thus, V.IP DSS 10 can transmit analog signal bursts which include video and audio information to V.IP television 13 and/or V.IP VCR 14 by including the network addresses of these elements in the preamble of the analog signal bursts. Similarly, V.IP DSS 10 can transmit analog signal bursts which include audio information to V.IP speakers 11 and 12. The analog signal bursts can be broadcast to a plurality of consumer electronic devices or uni-cast to a single one of the consumer electronic devices by selecting the destination addresses.

In another example, V.IP telephone 16 can transmit analog signal bursts which contain control information to V.IP television 13. This control information can cause V.IP television 13 to "turn off" or "turn down the volume" while the consumer is engaging in a telephone call. This control information can be generated in response to the consumer's entries on the control panel circuitry 102, or in response to wireless control signals received by wireless receiver circuit 103 from V.IP remote control 20. V.IP telephone 16 can also transmit analog signal bursts which contain audio information to V.IP speakers 11 and 12, thereby broadcasting a telephone call over these speakers. Again, the transmission of such audio information can be controlled by the consumer's entries via the control panel circuitry 103, or in response to wireless control signals received by wireless receiver circuit 103 from V.IP remote control.

In another example, V.IP tuner 18 (or V.IP CD player 17) transmits analog signal bursts containing audio information to V.IP speakers 11 and 12. The V.IP speakers 11 and 12 can be addressed in a manner which results in the creation of various audio effects (e.g., stereo, surround sound). The V.IP speakers 11 and 12 can also perform blending in response to time stamp information included in the analog signal bursts. For example, a middle speaker can blend audio information addressed to left and right speakers to create audio information for a center channel.

The V.IP speakers 11 and 12 can also receive control information, such as on/off and volume control, from the various consumer electronic devices via the telephone line 2. Moreover, V.IP speaker 11 can receive control information from the V.IP remote control 20. This control information is received by the wireless receiver 103 within the V.IP speaker 11. Wireless receiver 103 transmits this control information to processor 105. Processor 105, in turn, transmits the control information through V.IP transmitter circuit 114 and onto telephone line 2 as an analog signal burst in the manner previously described. This analog signal burst includes the address of the consumer electronic device to be controlled. For example, the analog signal burst can include the address of V.IP tuner 18, and control the V.IP tuner 18 to reduce its volume or turn on or off. In this manner, consumer electronic devices which are outside the range of V.IP remote control 20 can be effectively controlled by V.IP remote control 20, as long as one of the consumer electronic devices is within the range of V.IP remote control 20.

Although the invention has been described in connection with several embodiments, it is understood that this invention is not limited to the embodiments disclosed, but is capable of various modifications which would be apparent to one of ordinary skill in the art. For example, although the present modems have been described in terms of particular consumer electronic devices, it is understood that other consumer electronic devices can be modified to implement the V.IP protocol in accordance with the present invention. Moreover, particular components, such as signal processors and effects generators, can be modified to implement the V.IP protocol. Thus, the invention is limited only by the following claims.

What is claimed is:

1. An in-home network comprising:

a telephone line; and a plurality of consumer electronic devices coupled to the telephone line, the consumer electronic devices communicating via a packet-based protocol over the telephone line, wherein each of the consumer electronic devices includes a wireless signal receiver, wherein a first one of the consumer electronic devices receives a control signal for controlling a second one of the consumer electronic devices and transmits the control signal to the second one of the consumer electronic devices on the telephone line.

2. The in-home network of claim 1, wherein the packet-based protocol enables a transmission rate sufficient to transmit uncompressed audio or compressed video information on the telephone line.

3. The in-home network of claim 1, wherein the transmission rate is at least about 1.5 Mbits per second.

4. The network of claim 1, wherein the packet-based protocol comprises the transmission of analog signal burst of discrete duration on the telephone line.

5. The network of claim 1, wherein the control signal controls the on/off status of the second one of the consumer electronic devices.

6. The network of claim 1, wherein the control signal controls the volume of the second one of the consumer electronic devices.

7. The network of claim 1, wherein the wireless communication is infra-red.

8. The network of claim 1, wherein each of the consumer electronic devices is individually addressable by signals transmitted on the telephone line.

* * * * *